Jan. 21, 1964 E. CLOOS 3,118,461
WEDGE GATE FOR SHUT-OFF VALVES
Filed March 27, 1961

3,118,461
WEDGE GATE FOR SHUT-OFF VALVES
Ernst Cloos, Sinn, Dillkreis, Germany, assignor to Doering G.m.b.H., Sinn, Dillkreis, Germany, a corporation of Germany
Filed Mar. 27, 1961, Ser. No. 98,603
Claims priority, application Germany Mar. 25, 1960
2 Claims. (Cl. 137—242)

My invention relates to gate valves and more particularly to the wedge-shaped gate body in such valves.

In the known gate valves the medium flowing through the valve may cause deposits to be lodged beneath the wedge gate in the "sack," i.e. the downwardly bulging bottom space, of the valve housing thus gradually clogging the valve sack. When the valve has been kept open for a prolonged period of time, the wedge gate, when being shifted downward to closed position, becomes seated upon such accumulated deposits so that the further downward motion may be obstructed by the deposits and a satisfactory sealing action may no longer be secured.

It is an object of my invention to eliminate such shortcomings.

To this end, and in accordance with a feature of my invention, the lower edge of the downwardly tapering sealing faces of the wedge gate is provided with downward extensions of spade- or blade-like shape. During the downward closing motion of the wedge gate, the protruding blades penetrate into any deposits and thus loosen such deposits and push them into the interior of the gate. It is of particular advantage to have the valve spindle revolvable but not axially displaceable with respect to the valve housing so that revolution of the spindle causes its threaded portion, engaged by a corresponding screw thread in the top of the wedge gate, to protrude more or less into the interior of the gate. During opening operation, the spindle then enters to a greater extent downwardly into the interior of the gate and thereby ejects therefrom any deposits that may have been collected and may have become hardened in the interior of the gate. Thereafter the flow of fluid passing through the open valve eliminates the ejected and broken accumulation of material. As a result, a continual cleaning of the valve sack takes place and a good sealing action of the gate is reliably secured.

The invention will be further described with reference to the drawing showing an embodiment by way of example.

Figure 1:
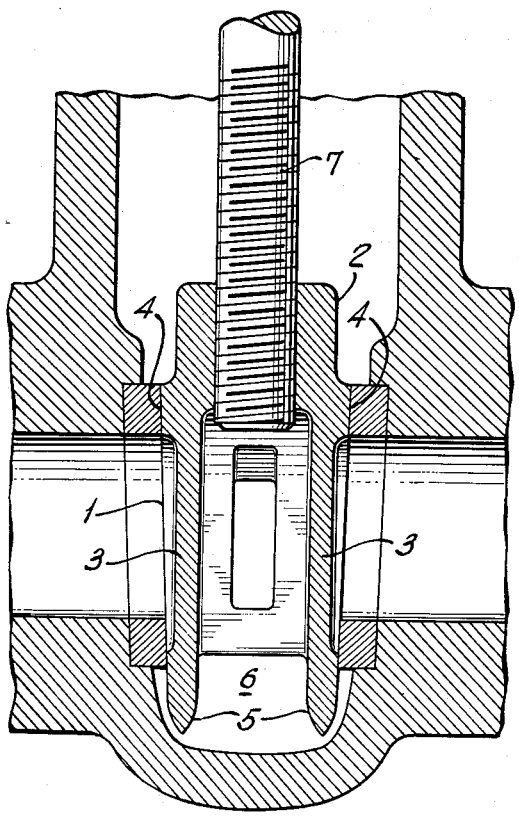
FIG. 1 is a vertical and axial section of a valve gate according to the invention and also shows the cooperating other components of the valve.
Figure 2:
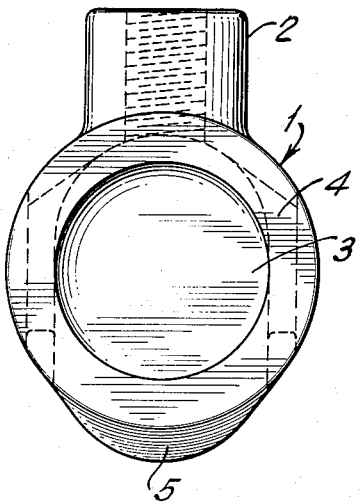
FIG. 2 is a side view of the valve gate.

According to FIGS. 1 and 2, the hollow wedge gate 1 has a top portion formed by a hub 2 whose vertical bore is threaded for engagement with the actuating spindle 7. The two axially opposite side walls 3 of the wedge gate, tapering downwardly toward each other, are provided with circular sealing faces 4 which, when the gate is in the illustrated closed position, are in wedged sealing engagement with corresponding sealing faces 8 of the valve housing. The valve housing thus forms a wedge space in which the gate is movable. This wedge space has a downwardly bulging bottom portion or sack 6. The gate body is provided with two extensions 5 which protrude downwardly from the respective sealing faces into the sack 6. As apparent from FIG. 2, the extensions 5 have a blade edge at the bottom and generally of crescent shape. The bottom opening of the hollow gate is preferably made so large as to extend substantially over the entire axial width of the gate.

Figure 3:
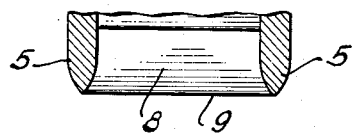
FIG. 3 is a sectional view of a somewhat modified valve gate, showing only the bottom portion thereof.

If this width is very large it may be desirable to brace the blade-shaped extensions 5 against each other by means of connecting webs. In this case such webs are preferably also provided with a knife edge at the bottom in order to aid in the above-described cleaning operation. Thus FIG. 3 shows two extensions 5 interconnected by a web 8 which is integral with the gate body and has a knife edge at 9.

It will be recognized that if any deposits have accumulated in the sack 6, the blades 5 will penetrate into the accumulation when the gate is being lowered to the illustrated closing position. The loosened deposits may then penetrate into the interior of the hollow gate body. During the next following opening motion of the gate, the gate body travels upwardly along the spindle 7 while the spindle is being turned. Thus the spindle penetrates downwardly into the hollow of the gate body and removes any accumulation of deposits which are then scavenged away by the flowing medium.

I claim:

1. A gate valve comprising a valve body having two axially spaced circular ring-seating grooves downwardly inclined towards each other, a pair of spaced sealing rings disposed in said grooves and having two opposed axially spaced gate-seating faces downwardly inclined towards each other to form a wedge-gate receiving space, said body having a downwardly bulging bottom portion communicating with said space, a wedge-gate disposed in said space, screw-spindle means threadedly engaged with said gate for raising and lowering said gate, said gate having two downwardly and inwardly tapering axially opposite sealing faces in sealing engagement with said gate-seating faces, said gate having integral blade-like tapered extensions protruding downwardly into said bulging bottom portion so that said extensions will break up deposits in said bottom portion as said gate is lowered to a closed position, said tapered extensions having cutting edges spaced toward each other away from the planes of sealing engagement formed by said sealing faces with said gate-seating faces.

2. A gate valve comprising a valve body having two axially spaced circular ring-seating grooves downwardly inclined towards each other, a pair of spaced sealing rings disposed in said grooves and having two opposed axially spaced gate-seating faces downwardly inclined towards each other to form a wedge-gate receiving space, said body having a downwardly bulging bottom portion communicating with said space, a wedge-gate disposed in said space, screw-spindle means threadedly engaged with said gate for raising and lowering said gate, said gate having two downwardly and inwardly tapering axially opposite sealing faces in sealing engagement with said gate-seating faces, said gate having integral blade-like tapered extensions protruding downwardly into said bulging bottom portion so that said extensions will break up deposits in said bottom portion as said gate is lowered to a closed position, said bottom portion being concavely contoured, said extensions being convexly contoured complementary to said concave contour of said bottom portion, said tapered extensions having cutting edges spaced toward each other away from the planes of sealing engagement formed by said sealing faces with said gate-seating faces.

References Cited in the file of this patent

UNITED STATES PATENTS

| | | |
|---|---|---|
| 286,656 | Van Wie | Oct. 16, 1883 |
| 330,322 | Hall | Nov. 10, 1885 |
| 623,194 | Vollmann | Apr. 18, 1899 |
| 1,941,443 | Moran | Dec. 26, 1933 |
| 2,253,888 | Carlson | Aug. 26, 1941 |

FOREIGN PATENTS

| | | |
|---|---|---|
| 149,346 | Sweden | Mar. 22, 1955 |